United States Patent
Wang et al.

(10) Patent No.: US 7,078,631 B2
(45) Date of Patent: Jul. 18, 2006

(54) SPRING SCALE

(75) Inventors: Dag T. Wang, Oslo (NO); Ralph W. Bernstein, Bekkestua (NO); Geir Uri Jensen, Oslo (NO); Eivind Lund, Oslo (NO)

(73) Assignee: Sintef Elektronikk OG Kybernetikk, Oslo (NO)

( * ) Notice: Subject to any disclaimer, the term of this patent is extended or adjusted under 35 U.S.C. 154(b) by 0 days.

(21) Appl. No.: 10/505,338

(22) PCT Filed: Feb. 24, 2003

(86) PCT No.: PCT/NO03/00068

§ 371 (c)(1),
(2), (4) Date: Nov. 4, 2004

(87) PCT Pub. No.: WO03/071241

PCT Pub. Date: Aug. 28, 2003

(65) Prior Publication Data

US 2005/0061553 A1    Mar. 24, 2005

(30) Foreign Application Priority Data

Feb. 25, 2002    (NO) .................................. 20020901

(51) Int. Cl.
G01G 3/14    (2006.01)
(52) U.S. Cl. ............ 177/211; 73/862.621; 73/862.626; 73/862.636
(58) Field of Classification Search ................ 177/211; 73/862.621, 862.626, 862.632, 862.633, 73/862.634, 862.636, 514.33, 514.34
See application file for complete search history.

(56) References Cited

U.S. PATENT DOCUMENTS

| | | | | |
|---|---|---|---|---|
| 4,381,826 A | * | 5/1983 | Kupper ........................ 177/211 |
| 4,458,770 A | | 7/1984 | Bucci ...................... 177/210 C |
| 4,542,800 A | * | 9/1985 | Knothe et al. ............... 177/211 |
| 4,548,086 A | * | 10/1985 | Kastel .................... 73/862.632 |
| 4,553,436 A | | 11/1985 | Hansson ................... 73/514.33 |
| 4,600,066 A | * | 7/1986 | Griffen et al. .............. 177/211 |
| 4,641,539 A | * | 2/1987 | Vilimek ................. 73/862.636 |
| 5,388,460 A | | 2/1995 | Sakurai et al. ......... 73/862.641 |
| 5,786,549 A | * | 7/1998 | Serizawa .................... 177/211 |
| 5,814,740 A | | 9/1998 | Cook et al. .............. 73/514.32 |

FOREIGN PATENT DOCUMENTS

EP    1 052 748 A2    11/2000
GB    2 296 977 A    7/1996

* cited by examiner

Primary Examiner—Randy W. Gibson
(74) Attorney, Agent, or Firm—Ladas & Parry LLP

(57) ABSTRACT

A spring scale, in particular for weighing loads in the μg-mg range, comprises a load platform suspended by at least three flexural springs in a surrounding frame, and has bridge-connected strain gauges arranged for measuring strain on one side of the flexural springs. The flexural springs extend in succession along substantially the whole periphery of the load platform in a gap between the load platform and the inner edge of the frame, and an attachment spot on the load platform for every flexural spring is arranged substantially directly opposite or past an attachment spot on the inner edge of the frame for a next flexural spring in the succession of springs. Preferably, the spring scale is made in one piece, and manufactured by means of semiconductor process technology.

19 Claims, 4 Drawing Sheets

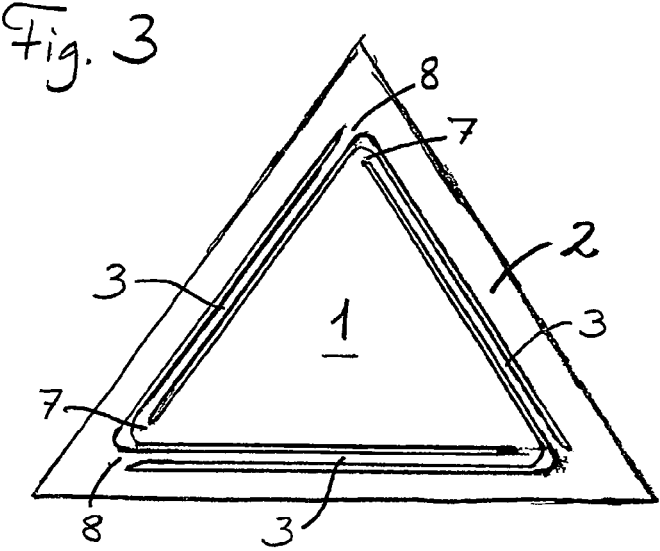
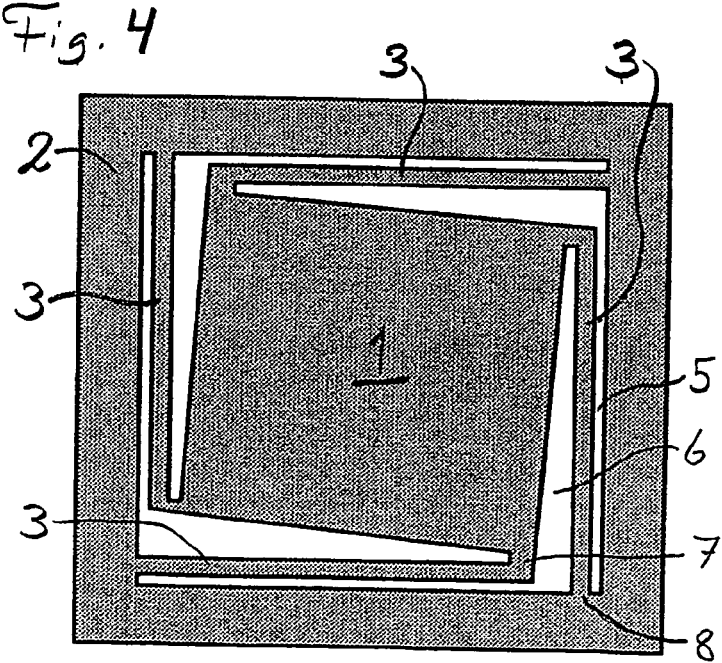

SPRING SCALE

The present invention relates to a spring scale, and more in particular a spring scale which comprises a load platform suspended, by means of at least three flexural springs, in a surrounding frame, and with bridge connected strain gauges arranged for measuring strain on one side of the flexural springs. The use area for the spring scale in accordance with the invention is preferably within micro-weighing, i.e. weighing of objects having a mass in the μg and mg ranges. Spring micro-scales of this type are useful i.e. in biological, chemical and pharmaceutical laboratories, where it may become necessary to measure very small weights.

A spring platform scale of a type that is somewhat related in construction to the present invention, is previously known from U.S. Pat. No. 3,966,003. In this patent, a central load platform is suspended in four parallel flexural beams, and the flexural beams are equipped with strain gauges connected in a Wheatstone bridge. The flexural beams are integral with the load platform and with two end pieces that are in their turn attached in a framework. This scale is intended for weighing vehicles, i.e. for receiving a vehicle wheel on the load platform, and the scale is preferably constructed from metal to withstand large weights. Hence, this is not related to a "micro-scale".

Also U.S. Pat. No. 4,726,436 discloses, in similarity with U.S. Pat. No. 3,966,003, a platform scale for weighing vehicles, i.e. large weights. Special flexural beams interconnect a central load platform with a surrounding framework, in a geometry that for the rest looks similar to the geometry of U.S. Pat. No. 3,966,003. The load platform consists of metal, ceramics, plastics or similar material.

From EP-0 014 460-B1 is previously known a person scale (bathroom scale) of the same general construction type as mentioned in the introduction. Especially the embodiment appearing from FIG. 4 of the publication exhibits a structure that is interesting with regard to correct measurement, through the fact that the flexural beams in which the load platform is suspended, are arranged in such a manner that the load platform will rotate somewhat about a vertical axis when it is pushed down by a load, and thereby the lengths of the flexural beams are maintained approximately constant instead of being stretched. This is obtained by arranging the flexural beams along the sides of the load platform in a uniform manner.

However, all the above-mentioned platform scales are made to weigh relatively large weights, in the range from a person's weight and upwards, and they are not suitable for weighing in the micro-range, i.e. weights in the μg range and up to about 1000 mg. Within such a micro-weight range, special requirements are set up regarding spring compliance, handling ability, precision and stability.

A micro-scale made from semiconductor material, in particular from silicon, is previously known from U.S. Pat. No. 4,960,177. In this solution a whole membrane is used as a spring element around a central load platform, and a capacitive method is used for reading of weight. However, this patent mentions alternative solutions like flexural springs as a replacement for the membrane, and a piezo resistor technique with a bridge connection for reading the weight. However, these alternatives are only mentioned in a general manner.

The present invention aims at providing a construction that, in similarity with U.S. Pat. No. 4,960,177, is specially adapted to the field of micro-weighing, but that, by way of its geometrical construction, will entail improved characteristics.

Hence, in accordance with the invention there is provided a spring scale such as mentioned in the introduction, and that is characterized in that the flexural springs extend in succession along substantially the whole periphery of the load platform in a gap between the load platform and an inner edge of the frame, and in that an attachment spot on the load platform for each respective flexural spring is arranged substantially directly opposite or past an attachment spot on the inner edge of the frame for a next flexural spring in the succession. From these special features, a micro-scale is obtained having compliance adapted to weighing in the micro-range, improved stability, very good linearity and insensitivity as to where a load is placed on the load platform.

In an important embodiment of the present invention, the load platform, the flexural springs and the frame are shaped as one single micro-machined or etched piece of solid matter. Preferably, the piece of solid matter is in silicon. The strain gauges may be integral in the piece of the solid matter.

Preferably, the strain gauges are piezo-resistive resistors.

Preferably, each flexural spring has a strain gauge arranged on a crossing between the flexural spring and the frame or load platform.

In a favorable embodiment of the invention, the load platform is substantially quadratic.

The flexural spring may lie parallel to respective side edges of the load platform. The lengths of the flexural springs may then be substantially equal in length to the closest side edges of the load platform.

In a preferable embodiment, the frame, preferably having a somewhat larger thickness than the load platform and the flexural springs, rests on a substrate that extends in under the load platform to be able to work as an end stop for a downward swing of the load platform, and the frame is attached to the substrate. The substrate is possibly equipped with a central opening underneath the load platform for inspection and cleaning. The substrate may be made of glass, and it may be attached to the frame by anodic bonding.

In a preferred embodiment of the invention, a roof above the load platform is attached peripherally to the frame, and it has a central opening above the load platform for placing objects to be weighed, and it has an additional function as an end stop for possible swings of the load platform upwards. The roof may be made of glass, and it can be attached to the frame by anodic bonding.

Preferably, the number of flexural springs is four.

The mechanical structure constituted by the load platform, the flexural springs and the frame, preferably exhibits four-fold rotation symmetry about a point in the center of the load platform.

The load platform and the inner edge of the frame have substantially complementary shape.

In the following, the invention will be discussed in further detail by going through exemplary embodiments of the invention, and in this connection it is referred to the appended drawings, among which FIG. 1 shows schematically a preferred embodiment of a spring scale in accordance with the invention, in a view from above, FIGS. 2, 3 and 4 show, in the same manner as in FIG. 1, alternative embodiments of a spring scale in accordance with the invention, FIG. 5 shows schematically the same embodiment as in FIG. 1, in a cross section view from the side, and with surrounding details, FIG. 6 shows the same as in FIG. 5, however in a situation with a load applied to the scale, FIG. 7 shows the same situation as in FIG. 6, but in a perspective view, and without surrounding details, FIG. 8 shows a ready micro-weight in accordance with the same embodiment of the invention as in FIG. 1, in a perspective view and with completing details, and FIG. 9 shows an example of a bridge connection for the sensor elements used in the spring scale of the present invention.

In its best exemplified embodiment, the present invention is a small spring scale that has been etched or micro-machined from a connected piece of semiconductor material, preferably silicon. The technology present regarding semiconductor manufacture, is used in this case to manufacture an object that shall not primarily work in the manner semiconductors will do, namely as elements influencing current and voltage signals, but on the contrary like a mechanical spring scale. Thus, with this type of technology we provide centrally a load platform, that via at least three flexural beams/flexural springs is connected with a surrounding frame, and everything is in a planar configuration and connected in one piece. (However, in a preferred embodiment, the characteristics of the semiconductor material and the semiconductor technology are utilized also in a more "ordinary" manner, namely by shaping the sensor elements that are used for detecting a load, as elements integral in the semiconductor material itself.)

But in its most general and basic embodiment, the spring scale in accordance with the invention is not restricted to be in one single piece or to be made from semiconductor material, because the central feature of the invention is a substantially the geometrical shape of the scale, with flexural springs in succession along and round the edge of the load platform. The load platform is essentially surrounded by such flexural springs. In accordance herewith, many geometrical shapes may be used in general, as long as the central load platform is suspended in at least three flexural springs that connect the load platform with a surrounding frame. However, a construction with four flexural springs is preferable, from reasons to be mentioned later.

Referring to FIG. 1, a preferred exemplary embodiment of a spring scale in accordance with the present invention is shown schematically and in a view from above. A semiconductor disc, in this example having the shape of a square, has in its center a load platform 1 upon which the object to be weighed, is put. The load platform 1 is suspended in a frame 2 by means of flexural beams or flexural springs 3, which beams/springs are in the shown example arranged along each side edge of the load platform, and slits 5, 6 have been etched or machined to provide the flexural beams 3, in such a manner that a slit has one slit part 5 on the outside of the flexural beam 3, and a continuing part 6 on the inside of the next flexural beam 3. In such a construction the flexural beams 3 become relatively long and compliant, i.e. the load platform 1 can be given a deep swing. Each flexural beam 3 is situated in a gap between the frame 2 and the load platform 1, which gap is defined by the slit parts 5 and 6. Every flexural beam 3 has an attachment spot 7 to the load platform 1, situated directly opposite the attachment spot 8 of an adjacent flexural beam to frame 2.

Reference numeral 4 designates sensors for recording a load on the load platform 1. With a load, the load platform 1 will go down (in a direction of view down under the paper plane in FIG. 1), and the flexural beams 3 will bend and assume a shape similar to an S. The load platform will then at the same time rotate somewhat about an axis perpendicularly to the plane of the load platform, because the length of the beams is in large constant.

With the above-mentioned S-shape in a load situation, the most intense mechanical stresses in the flexural beams 3 will be found in the crossing areas to frame 2 and load platform 1 (i.e. at the attachment spots 7 and 8), and it is therefore favorable to mount strain gauges 4 for example like shown in FIG. 1. Alternatively, the strain gauges can also be mounted in the crossings to the load platform instead of crossings to the frame, but this will require longer leads from the strain gauges and out to the signal processing equipment.

In the way the strain gauges 4 have been mounted in FIG. 1, all four gauges are positioned in the same direction, with regard to optimizing for connecting the sensors in a Wheatstone bridge. The sensors/gauges can also be mounted differently, it is for instance possible to turn two of them 90° relative to the other two, and the bridge connection must then be modified somewhat.

In FIG. 2 appears a geometric alternative to the solution in FIG. 1, namely with a substantially circular load platform 1 inside a circular opening in a frame 2. Curved flexural beams (springs) 3 have attachment spots 7 and 8 to the load platform and frame respectively, and the attachment spots are situated directly opposite each other, i.e. load platform attachment spot 7 for a flexural beam lies directly opposite frame attachment spot 8 for a next flexural beam in the succession of flexural beams round along the periphery of the load platform. Also in this case there are four flexural beams, but it appears clearly that it might just as well have been more of these flexural beams, mounted after the same principle. Three flexural beams could also have been used, while only two flexural beams/springs would present a stability problem, and cannot be recommended. Strain gauges have been left out in FIG. 2, but they shall of course be situated for instance at the flexural beam attachment spots 8 to the frame, i.e. at the spots where surface stress is at the most intense in a weighing operation.

In a further development of the variant shown in FIG. 2, the curved flexural springs may overlap, in such a manner that a flexural spring (beam) continues past the outer starting point for the next flexural spring, before it finds its attachment spot to the load platform. (In the appended claim 1, this is what has been intended with the expression "or past".) Hence, the invention also comprises cases with flexural springs "spiraling" past/along each other in the gap between the load platform and the frame. This is valid also regarding other configurations than a circular configuration, even if such configurations will be difficult to manufacture as practically feasible solutions.

In FIG. 3 appears another possible configuration, namely with a triangular load platform 1 and three flexural beams 3 between the load platform and the frame 2, and with attachment spots 7, 8 in accordance with the same principle as mentioned above. Strain gauges, mounted for instance in the three attachment spots 8 (but not shown in the figure), will be connected in a modified bridge connection. (One among several connection options is as follows: a full bridge is provided by arranging four strain gauges (in the form of resistors) on each flexural beam, and then interconnecting one resistor from every beam in such a manner that these three together form one of the four resistors of the bridge—and then correspondingly for the other three bridge resistors.)

FIG. 4 shows a further variant, in which the inner slit 6 around the load platform 1 has been provided with a somewhat different shape than in FIG. 1, but in which the attachment spots 7 and 8 are still regarded as being situated opposite each other. (However, in a further development of such a change of shape as from FIG. 1 to FIG. 4, the definition of the invention will be lost when attachment spot 7 gets close to the middle of the inner edge length of the frame.) Thus, it is realized that a plurality of geometrical shapes will satisfy the requirements of the invention.

FIG. 5 shows schematically a cross-section through a central part of a spring scale in accordance with an embodiment of the present invention. From a start disc of silicon, there has been provided, using ordinary semiconductor preparation technology, a unitary structure 9 with a flat top surface and with a central area that has been thinned down and where the load platform 1 is defined by means of (not visible) slits, such as shown in FIGS. 1–4. The frame area 2 outside/round the load platform 1 may be substantially thicker, such as appearing from the drawing.

In the embodiment shown in FIG. 5, there is also arranged a base part 10, in this case made of glass. Preferably, the base part is attached to the frame 2 by means of so-called "anodic bonding". By making the base part 10 extend in under the load platform 1, it forms a swing-down limit for load platform 1, and hence the base part has a safety function. (Without such a swing-down limit, the flexural springs 3 might break if a too heavy weight were to be put on the load platform by is an accident.) In the shown embodiment, the base part 10 is also equipped with a central opening 12 with regard to inspection and cleaning.

Above the scale itself, there is arranged a roof 11 operating as an end stop for possible swings upward for load platform 1. Roof 11 also works as a topside protection. However, there is a central opening 13 in the roof in order that an object to be weighed can be laid down on the load platform, since the roof 11 in the shown embodiment is fixed to the silicon structure 9. A preferred material for roof part 11 is glass. Reference numeral 14 designates a contact section for signal leads from the strain gauges.

Figure 1:
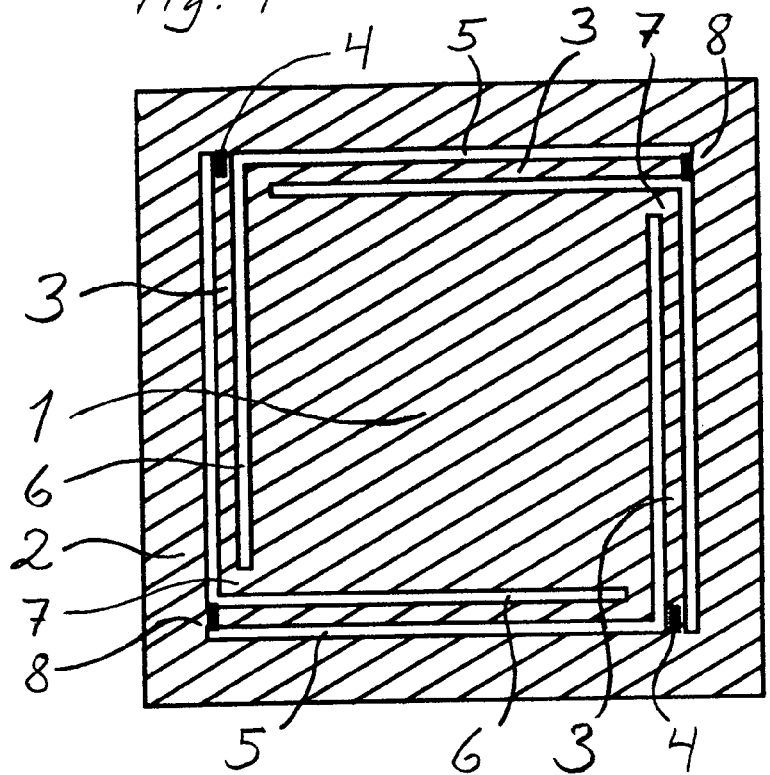
Figure 2:
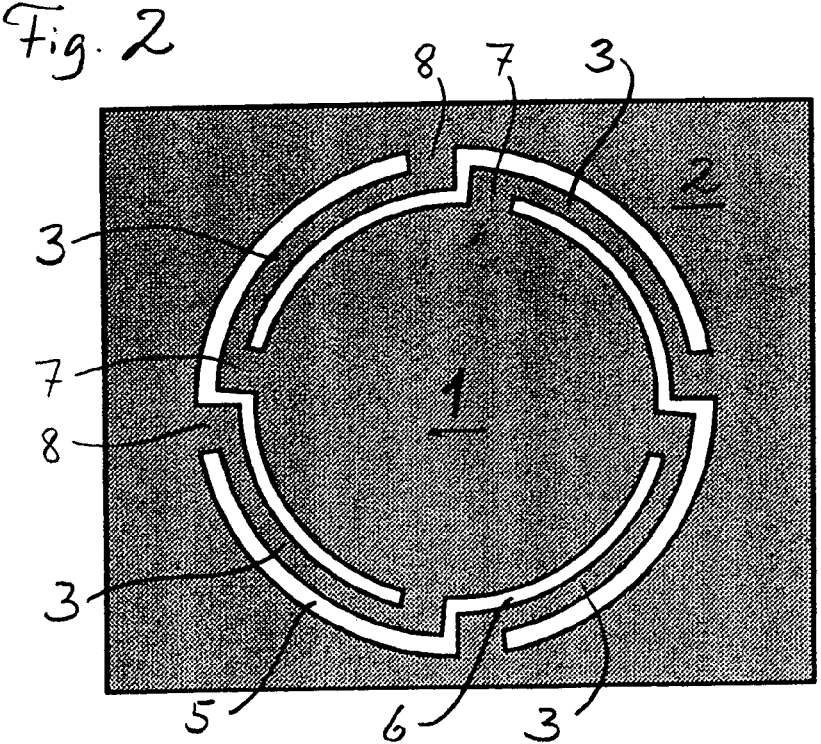
Figure 5:
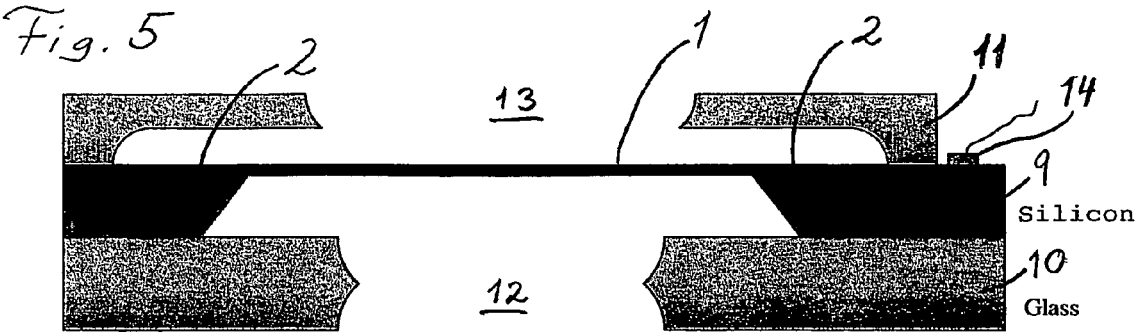
Figure 6:
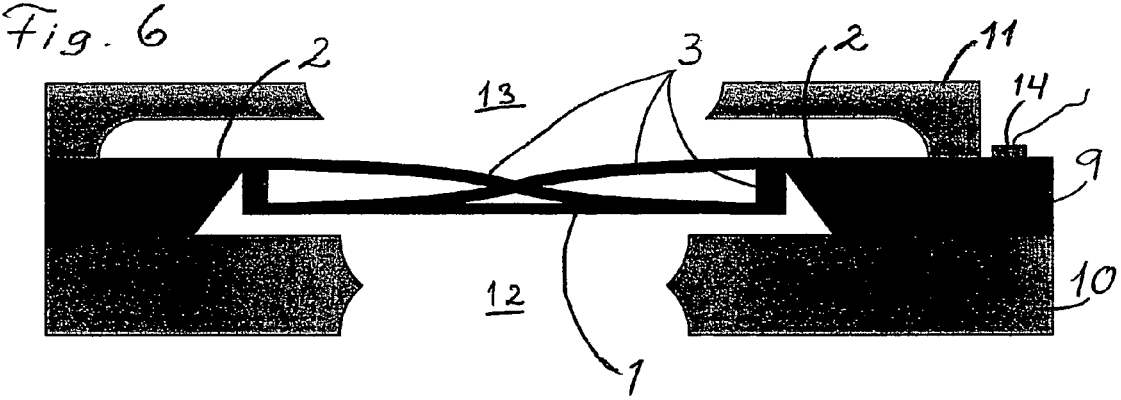
FIG. 6 shows the same as FIG. 5, however in a case where a (not shown) weight mass weighs down on the load platform 1. Hence, in this drawing the flexural beams 3 appear in a situation where two beams (a square shape like in FIG. 1 is assumed) can be seen in a side view and exhibit an S-shape, while the two other beams can be seen in a view "right on" at the outer ends of the load platform.
Figure 7:
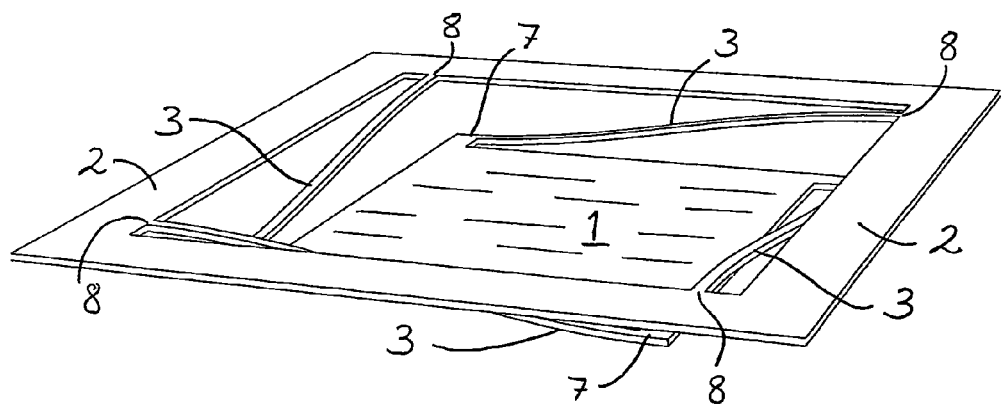
FIG. 7 shows in a perspective view a simulation of a weighing situation with a micro-scale in accordance with an embodiment of the invention, i.e. an embodiment such as shown in FIGS. 1 and 6. The movement principle with long flexural springs in an S-shape and simultaneously a small rotation of the load platform appears from the figure.
Figure 8:
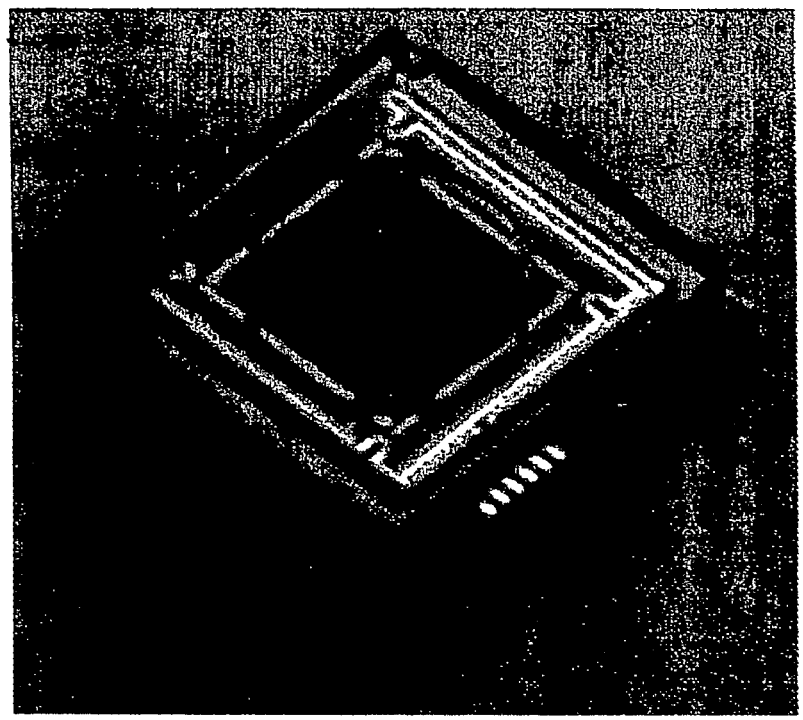

FIG. 8 is a photograph of a ready-made micro-scale in accordance with an embodiment of the invention, with a square load platform like in FIG. 1. Conductor paths from the strain gauges appear as light bands underneath the transparent glass roof. The conductor paths have been made by "sputtering" and consecutive photolithographic pattern forming. For the rest, the construction is in accordance with what is shown in FIGS. 5 and 6. The manufacturing process is to a certain degree described in the article "The Nordic Manufacturing Cluster in Europractice is entering its second phase", Stein I. Hansen, Karin Hermansson, Geir U. Jensen and Alan H. Boyd, MST News 2/2000 page 16–18.

Figure 9:
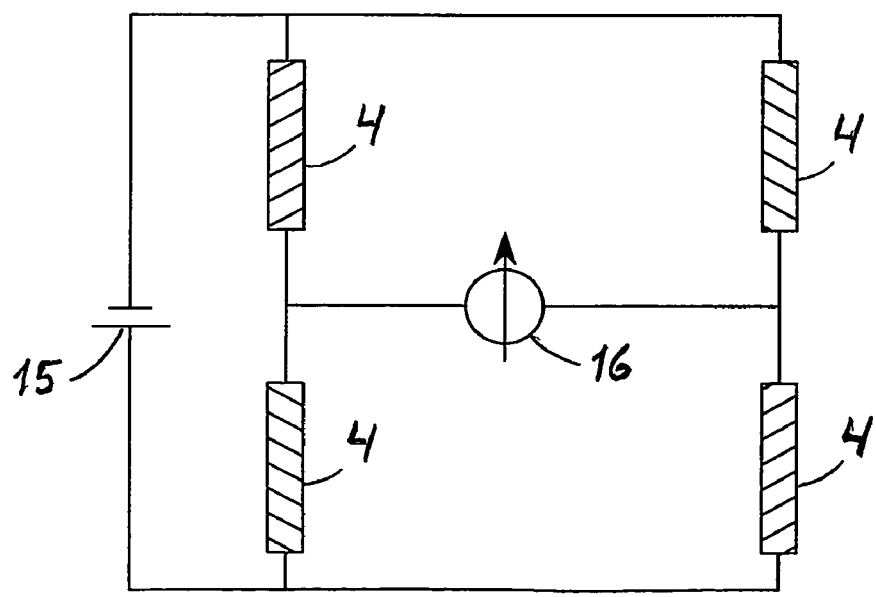

FIG. 9 shows an example of a bridge circuit that can be used for providing a measurement result from weighing by means of the scale of the present invention. The bridge circuit shown in the drawing, is a Wheatstone bridge adapted to the case of FIG. 1, in which every strain gauge 4 is mounted in the same direction. The strain gauges are in the form of resistors 4 in FIG. 9, and the Wheatstone bridge circuit is completed by a current source (battery) 15 and a measurement instrument 16. This is a standard type circuit, but as previously mentioned, for instance in connection with FIG. 3, other bridge circuit variants may be used in connection with other embodiments with other strain gauge configurations.

When the load platform 1 of the scale is loaded in weighing, the parameter that is actually measured is the bend in the flexural beams. This is done by measuring strain on top of the flexural beams. The beam is stretched on one side and compressed on the opposite side. About the same functionality and sensitivity is achieved by placing the strain gauges in the crossing between flexural beam and load platform, as in the crossing between flexural beam and frame. But the last mentioned case is preferable, due to simpler layout for the conductor paths.

The strain gauges 4 can be arranged as separate sensors on top of the crossings in question (attachment spots 8 or 7), by means of depositing and pattern forming, or by gluing ready resistors. Or possibly, strain gauges in the form of piezo-resistors can be manufactured as an integral part of the silicon structure, arranged as a surface element, or so-called "SOI"-technology can be used to place a piezo-resistor on top of the silicon structure.

The use of four flexural beams is regarded as a preferable solution for the present invention. There are three reasons for this, namely:

1. In a Wheatstone bridge of standard type, just four resistors are included.
2. To have a stable load platform, it is desirable with three or more beams, and at the same time it is desirable with lone beams to increase compliance, i.e. one should not use too many beams.
3. For a micro-scale manufactured in silicon, it is a point that silicon (100) discs have four-fold symmetry, and this entails that the piezo-resistors should be positioned along the [011] or [01$\bar{1}$] directions.

Hence, in the silicon technology it is difficult to imagine a more sensible solution than using four flexural beams.

The invention claimed is:

1. A spring micro-scale, comprising a load platform suspended, by at least three flexural springs, in a surrounding frame, and with bridge-connected strain gauges arranged for measuring strain on one side of said flexural springs, said flexural springs extending in succession along substantially the whole periphery of the load platform in a gap between the load platform for each respective flexural spring being arranged substantially directly opposite or past an attachment spot on the inner edge of the frame for a next flexural spring in the succession, and said load platform being thinner than said surrounding frame.

2. The micros scale of claim 1,
   wherein the strain gauges are all oriented in the same direction, to obtain insensitivity regarding positioning of an object on the load platform.

3. The micro-scale of claim 1,
   wherein the flexural springs are thinned down to provide high compliance for weighing of small objects.

4. The micro-scale of claim 1,
   wherein the load platform, the flexural springs and the frame are shaped as one single micro-machined or etched piece of solid matter.

5. The micro-scale of claim 4,
   wherein said piece of solid matter is a silicon piece.

6. The micro-scale of claim 4,
   wherein said strain gauges are integral in the piece of solid matter.

7. The micro-scale of claim 1,
wherein the strain gauges are piezo-resistive resistors.

8. The micro-scale of claim 1,
wherein each flexural spring has a strain gauge placed on a crossing between the flexural spring and the frame or the load platform.

9. The micro-scale of claim 1,
wherein the load platform is substantially quadratic.

10. The micro-scale of claim 1,
wherein the flexural springs lie parallel to respective side edges of the load platform.

11. The micro-scale of claim 9 or 10,
wherein the flexural springs have lengths substantially equal to the lengths of the closest side edges of the load platform.

12. The micro-scale of claim 1,
wherein the frame rests on, and is attached to, a substrate extending in under the load platform to work as an end stop for a swing downward of the load platform.

13. The micro-scale of claim 12,
wherein said substrate is made of glass, and is attached to the frame by means of anodic bonding.

14. The micro-scale of claim 1, further composing a roof above the load platform, said roof being attached peripherally on the frame, with a central opening above the load platform for placing objects to be weighed, and with an additional function as an end stop for possible swings upward of the load position.

15. The micro-scale of claim 14,
wherein the roof is made of glass, and that it is attached to the frame by anodic bonding.

16. The micro-scale of claim 1,
wherein the number of flexural springs is four.

17. The micro-scale of claim 1,
wherein the mechanical structure constituted by load platform, flexural springs and frame, exhibits a four-fold rotation symmetry about a point at the center of the load platform.

18. The micro-scale of claim 1,
wherein the load platform and the inner edge of the frame have a substantially complementary shape.

19. The micro-scale of claim 12, wherein said substrate is equipped with a central opening underneath the load platform, for inspection and cleaning.

* * * * *